June 12, 1951          M. SILGE          2,556,344
REFRACTOMETER EMPLOYING THE PRINCIPLE OF TOTAL REFLECTION
Filed Dec. 14, 1948
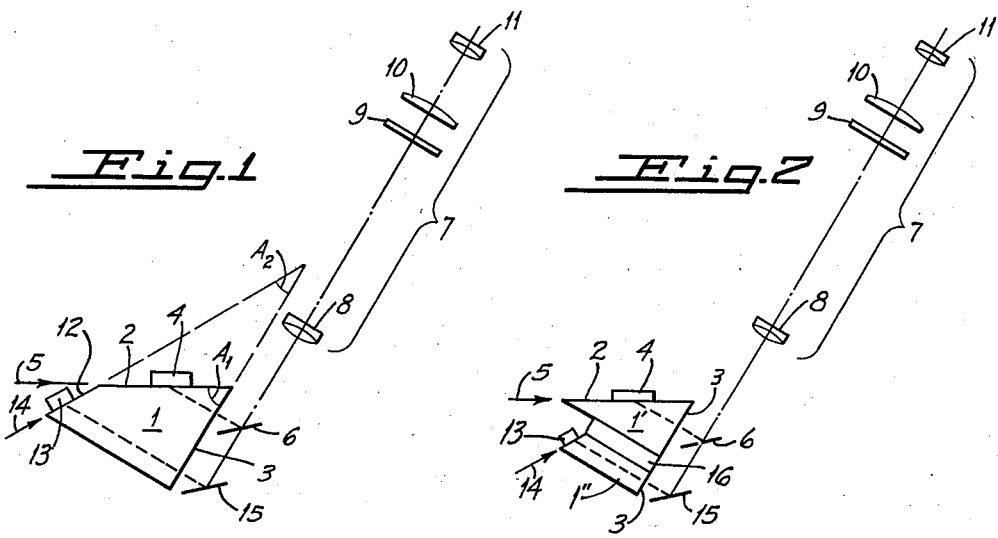
INVENTOR.
Martin Silge
BY
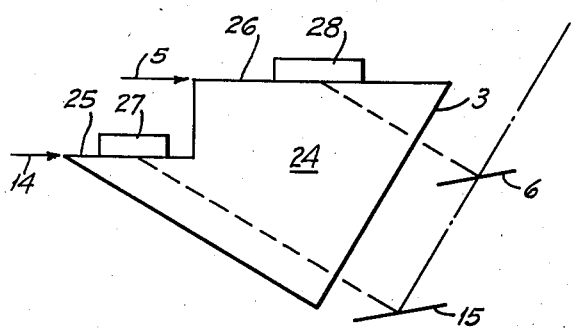
ATTORNEY Patented June 12, 1951

2,556,344

UNITED STATES PATENT OFFICE 2,556,344

REFRACTOMETER EMPLOYING THE PRINCIPLE OF TOTAL REFLECTION

Martin Silge, Oakland, Calif.

Application December 14, 1948, Serial No. 65,097

2 Claims. (Cl. 88—14)

The present invention relates to improvements in refractometers and has particular reference to refractometers employing the principle of total reflection.

The principal object of the invention is to provide means, in combination with a refractometer of the character described, allowing the operator to instantly check the calibration of the refractometer at all times, even while the instrument is being used for testing the refractive index of a sample under observation.

The proper calibration, i. e., determining of the zero point, of a refractometer is an indispensable prerequisite for obtaining correct readings with the instrument. The standard method currently employed makes use of a calibration standard of known refractive index, such as a glass body or a liquid. The calibration standard is brought into optical contact with the index prism of the refractometer, and the latter is then adjusted to read against the calibration standard.

This method of calibration is awkward, time consuming, and often unreliable because of the "human factor" in executing the motions required. In order to establish the required optical contact between the entrance face of the refractometer prism and the calibration standard—in the case of the latter being a solid body—a liquid of higher refractive index than either that of the calibration standard or refractometer prism is used, for example, monochromnaphthalene. The proper execution of this procedure requires skill and time.

When liquids are used as calibration standards, it is necessary that they be stable with reference to their refractive indices and their temperature be carefully controlled when executing calibrations because even slight temperature changes affect the refractive indices of liquids.

Because of the inherent drawbacks of the described calibrating methods, they often do not produce the desired results or are neglected altogether. Moreover, since these methods are dependent on the use of the entrance face of the refractometer prism, it is obvious that the latter must be properly prepared each time a calibration check is to be made, and that this check cannot be carried through while the refractometer prism is charged with a sample the refractive index of which is to be determined.

The present invention proposes the use of a method of calibration different and free from the drawbacks of those described above. More particularly, it proposes to build into the refractometer permanently the means for checking the calibration of the instrument instantly, without requiring any particular skill on the part of the operator, and permitting him to carry through this check even while the refractometer is being used on a sample the refractive index of which is to be determined.

To this end it is proposed that the index prism of the refractometer be of such design that in addition to the entrance face (the surface which is to receive the matter to be measured) there be a second entrance face, the latter to be in operative relation to and spaced from the former in such a manner that it can function independently from same. This second entrance face is to be in permanent optical contact with a calibration standard. The calibration standard should preferably be of such a substance that temperature does not effect its refractive index to any appreciable degree, as for example, air or glass.

The "calibration face," as we shall call for simplicity's sake this described second prism entrance face, forms with the exit surface of the refractometer prism a "refractive angle" of such a magnitude that the "demarkation line of total reflection" of the object used as a calibration standard becomes visible in the field of view of the refractometer-telescope. By proper choice of the angular value of said refractive angle this demarkation line may be projected into the field of view of the refractometer-telescope simultaneously with that of the demarkation line of total reflection of the material to be measured and which is deposited on the first entrance face of the refractometer prism. The simultaneous imaging of the two demarkation lines in the field of view of the telescope may be desirable in the case of refractometers where index prism and telescope are rigidly mounted relative to each other. Refractometers having the index prism and telescope mounted in a moveable relation to each other may use the built-in calibration feature as a reference point within the range of mechanical motion of either telescope or prism.

The preferred forms of my invention are illustrated in the accompanying drawing, in which Figure 1 schematically illustrates one form of my invention, Figure 2 schematically illustrates a second form of the invention, Figure 3 similarly shows a third form of the invention, and Figure 4 shows a fourth form of the same.

While I have shown only the preferred forms of the invention, it should be understood that various changes and modifications may be made within the scope of the claims attached hereto without departing from the spirit of the invention.

Referring to the drawing in detail, Figure 1 shows an index prism 1 with an entrance face 2 and an exit face 3. The refracting angle A, determines the position of the two faces with respect to one another. At 4 is shown the specimen the refractive index of which is to be measured. A beam of light 5 enters the specimen 4 and entrance face 2 by grazing incidence. It is refracted into the prism and leaves it through the exit surface 3.

A reflector 6 reflects the beam into the telescope 7 comprising an objective 8, a scale 9, a lens 10 and an eye piece 11, so that the refractive index (or its equivalent) of the specimen can be read on the scale in accordance with the principles governing refractometers employing the observation of the line of demarkation of total reflection.

At 12 is shown a second entrance face for the prism, the so-called "calibration face," with a refracting angle $A_2$. A calibration standard 13 is in permanent optical contact with the calibration face. A beam of light 14 enters the calibration standard 13 and the prism by grazing incidence and is refracted into the prism, leaving the same through the exit surface 3. The beam is reflected by a second reflector 15 into the telescope 7 where the position of the line of demarkation of total reflection can be read on the scale in the same manner as described above with regard to the specimen 4. The reflector 6 may be made of translucent material to allow beams reflected from the reflector 15 to pass therethrough.

Since the second face 12 with the refracting angle $A_2$ and the calibration standard 13 are built-in constants, it follows that the line of demarkation of total reflection originating from standard 13, when observed through the same telescope which serves for the observation of the line of demarkation of total reflection of specimen 4, is a reliable reference point against which the scale of the refractometer can be checked and adjusted instantly regardless of whether or not a specimen 4 is on the entrance face 3 of the prism.

Figure 2 shows an alternate construction. In this form the prism is made in two parts 1' and 1", the two parts or units being rigidly connected to each other by any suitable material 16. Part 1' is the measuring prism and part 1" the calibrating prism. It is apparent that in this construction the same results will be obtained with regard to calibrating the refractometer as in the first form.

In both Figures 1 and 2 the two entrance surfaces of the prism are arranged at an angle to one another, one of the faces having a refracting angle $A^1$ and the other a refracting angle $A^2$. This angle between the entrance faces serves the purpose of bringing images of borderlines of total reflection produced by two specimens of widely varying refractive indices within a narrow field of vision on the scale. If there is no marked difference between the refractive indices of the standard and the range of samples for which the refractometer is intended, no such angular relationship between the entrance faces is necessary, and the two entrance faces may be made parallel to one another or may even be arranged in the same plane.

Figure 3, for instance, shows a prism structure involving two prism units 17 and 18 rigidly interconnected, as by straps 19, and having parallel entrance faces 20 and 21, the former having a sample 22 to be tested in contact therewith and the latter having a calibration standard 23 in permanent contact therewith.

Figure 4 shows a similar arrangement comprising a single prism 24 in which the entrance face 25 is stepped down with respect to the entrance 26, the former being in permanent contact with a calibration standard 27 and the latter being intended for holding the sample 28 to be measured. These two faces may be parallel.

It is apparent that air may be used as calibration standard and is intended to be covered by such repressions as "a calibration standard in permanent contact with one of the entrance faces."

I claim:

1. In a refractometer employing the principle of total reflection, an index prism having an entrance face and an exit face, the entrance face having a calibration standard in permanent contact therewith, a scale mounted with respect to the exit face, and optical means interposed between the exit face and the scale and including an objective operative to form an image of rays of grazing incidence entering the calibration standard on the scale to furnish a reference point against which the scale may be checked, the index prism having a second entrance face for holding a test sample and related to the optical means to cause the latter to form an image of rays of grazing incidence entering the test sample on the same scale simultaneously with the formation of the former image.

2. In a refractometer employing the principle of total reflection, an index prism having an entrance face and an exit face, the entrance face having a calibration standard in permanent contact therewith, a scale mounted with respect to the exit face, and optical means interposed between the exit face and the scale and including an objective operative to form an image of rays of grazing incidence entering the calibration standard on the scale to furnish a reference point against which the scale may be checked, the index prism having a second entrance face for holding a test sample and related to the optical means to cause the latter to form an image of rays of grazing incidence entering the test sample on the same scale simultaneously with the formation of the former image, and the two entrance faces being related angularly to compensate for wide variations in the refractive indices of the calibration standard and the test sample so as to bring the two images into a narrow field on the scale for observation purposes.

MARTIN SILGE.

REFERENCES CITED

The following references are of record in the file of this patent:

UNITED STATES PATENTS

| Number | Name | Date |
| --- | --- | --- |
| 1,868,908 | Lindley | July 26, 1932 |
| 2,380,469 | Schmarion | July 31, 1945 |
| 2,383,347 | Silge | Aug. 21, 1945 |
| 2,391,599 | Silge | Dec. 25, 1945 |

FOREIGN PATENTS

| Number | Country | Date |
| --- | --- | --- |
| 287,331 | Germany | Sept. 17, 1915 |